Figure 1:
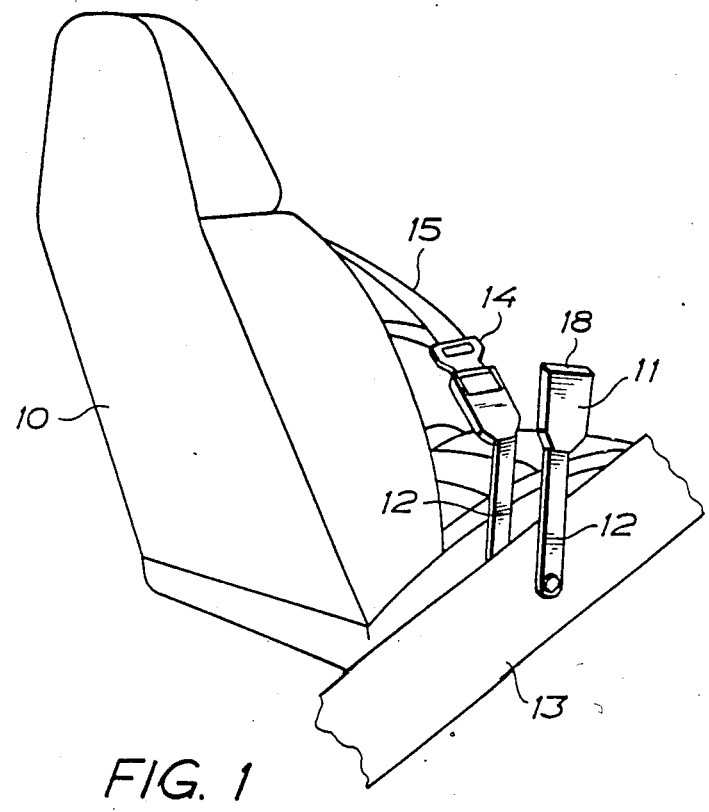

United States Patent [19]
Haglund et al.

[11] Patent Number: 4,569,535
[45] Date of Patent: Feb. 11, 1986

[54] DEVICE IN LOCKS FOR VEHICLE SAFETY BELTS

[75] Inventors: Lennart Haglund; Sigvard Johansson, both of Vårgårda, Sweden

[73] Assignee: AB Stil-Industri, Vårgårda, Sweden

[21] Appl. No.: 573,805

[22] Filed: Jan. 25, 1984

[30] Foreign Application Priority Data

Jan. 27, 1983 [SE] Sweden ............................. 8300410

[51] Int. Cl.⁴ .......................................... B60R 21/10
[52] U.S. Cl. .................................. 280/801; 297/468
[58] Field of Search ............... 280/801, 804; 297/468, 297/485; 24/636

[56] References Cited

U.S. PATENT DOCUMENTS

| 3,820,815 | 6/1974 | Noir | 297/468 |
| 4,400,013 | 8/1983 | Imai | 280/801 |
| 4,451,087 | 5/1984 | Tamamushi | 280/801 |
| 4,454,634 | 6/1984 | Haglund et al. | 24/636 |

FOREIGN PATENT DOCUMENTS 2621983 1/1977 Fed. Rep. of Germany .
2174566 12/1973 France .
1384386 2/1975 United Kingdom ............. 280/801

Primary Examiner—Richard A. Bertsch
Attorney, Agent, or Firm—Merchant, Gould, Smith, Edell, Welter & Schmidt

[57] ABSTRACT

A device in locks for vehicle safety belts, comprising a channeled frame (16) which is pivoted to a substantially rigid elongate anchoring fitting (12) constructed for attachment to the body of the vehicle. The lock forms an opening for the insertion of a lock tongue. A flat end portion of the anchoring fitting at opposite longitudinal edges thereof forms two projections (21) which are received with play in openings in the side walls of the channeled frame to allow angular adjustment of the lock in relation to the anchoring fitting about an axis substantially parallel to the web of the frame, between a normal position in which the lock is substantially aligned with the anchoring fitting, and another position in which the lock is angled in relation to said normal position. A member (17) is attached to the web of the channeled frame to form an abutment for the end edge of the flat end portion of the anchoring fitting, retaining the projections in the openings.

4 Claims, 4 Drawing Figures

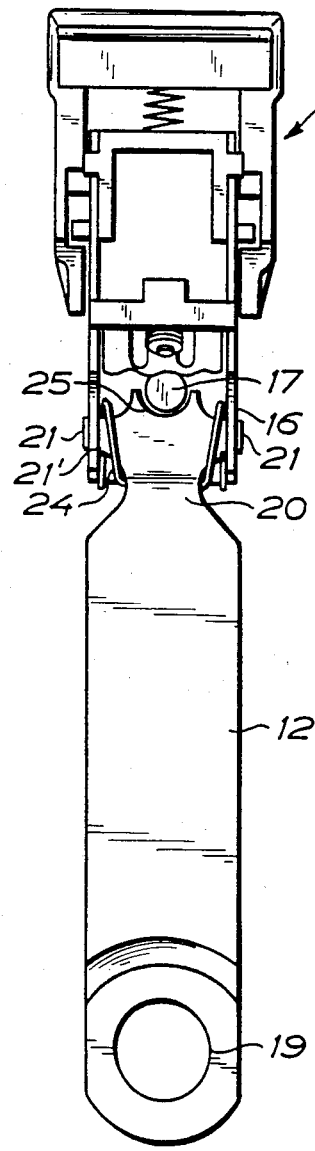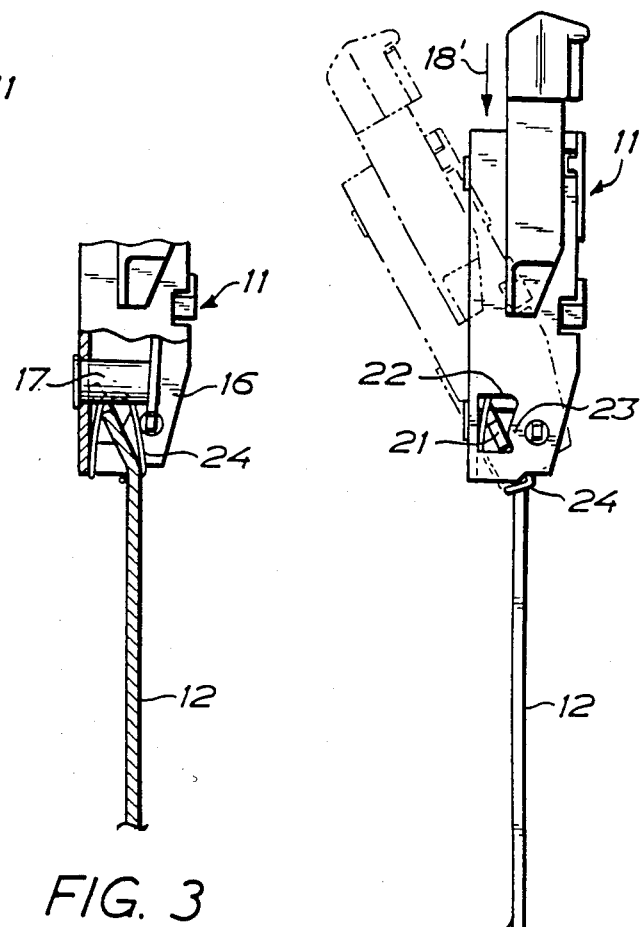
FIG. 2
FIG. 3
FIG. 4

DEVICE IN LOCKS FOR VEHICLE SAFETY BELTS

The invention relates to locks for vehicle safety belts, comprising a channeled frame which is pivoted to a substantially rigid elongate anchoring fitting constructed for attachment to the body of the vehicle, said lock forming an opening for the insertion of a lock tongue.

In order to facilitate the use of the lock the opening for the insertion of the lock tongue thereof should have such direction that the lock tongue can be inserted into the lock easily at lowermost friction. However, it is required at the same time that the belt lock can adapt itself to the geometry of the vehicle safety belt when the belt is being used. This adaption means that the lock can be positioned in different angles in relation to the anchoring in the vehicle body in dependence of the size of the person using the vehicle safety belt, and in dependence of the adjusted position of the seat. Such adaption is necessary in order to reduce the forward throw at a collision or a sudden retardation of the vehicle and in order to keep down the break forces acting on the lock when the vehicle safety belt is loaded, and also to allow rejection of the lock tongue from the lock at lowermost friction when the vehicle safety belt is put out of use.

It is previously known to pivot a belt lock to the associated anchoring fitting by using a ball joint (DE-A-2 621 963) German Publication of (FR-C-2 174 566) French Patent. In the latter case the pin may be formed by an anchoring wire loop (U.S. Pat. No. 3,820,815). These prior art devices and the mounting thereof are more complicated than can be accepted in modern mass production of belt locks for vehicle safety belts.

The object of the invention is to make possible said adaption of the position of the lock to the geometry of the vehicle safety belt by an uncomplicated device allowing the lock to be pivoted to the anchoring fitting, which can be manufactured by simple operations without the use of separate pivot members while providing a connection between the lock and the anchoring fitting, which can stand high loads without being deformed and without jeopardizing the possibility of angular adjustment of the lock on the anchoring fitting.

This object is achieved according to the invention in a lock of the kind referred to above by the device which is characterized in that a flat end portion of the anchoring fitting at opposite longitudinal edges thereof forms two projections which are received with play in openings in the side walls of the channeled frame to allow angular adjustment of the lock in relation to the anchoring fitting about an axis substantially parallell to the web of the frame, between a normal position in which the lock is substantially aligned with the anchoring fitting, and another position in which the lock is angled in relation to said normal position, and that a member is attached to the web of the channeled frame to form an abutment for the end edge of the flat end portion of the anchoring fitting, retaining the projections in the openings.

In order to more clearly explain the invention an illustrative embodiment thereof will be described below, reference being made to the accompanying drawings, in which FIG. 1 is a perspective view of a seat, as seen from the back thereof, in a car which is provided with belt locks in accordance with the invention, FIG. 2 is a plan view of the lock of the invention, FIG. 3 is a fragmentary longitudinal cross-sectional view of the lock in FIG. 2, and FIG. 4 is a side view of the lock in FIG. 2.

The seat disclosed in FIG. 1 is designated 10 and may be the left front seat in a vehicle wherein also a front seat is located at the right side. Between the front seats two belt locks 11 are provided for the left front seat and the right front seat, respectively, said locks being anchored to the vehicle body by means of an elongate anchoring fitting 12 which is shown to be attached to the propeller shaft housing 13 of the vehicle body. The left belt lock is connected with a lock tongue 14 on the vehicle safety belt 15 provided for the seat 10. The belt may be a retractor belt of the three-point type of a known construction. The belt lock and the lock tongue may be of anyone of the several well-known constructions available on the market. The details of the lock mechanism proper will not be described herein because they have no closer bearing on the invention.

In FIGS. 2–4 which disclose in more detail the belt lock and the anchoring means thereof the lock is of the construction described in the pending Swedish patent application No. 8004462-1 (or U.S. Pat. No. 4,454,634). The lock comprises a channeled frame 16 of hardened steel sheet, a pin 17 being attached to the web thereof. The lock is provided with a housing of plastic material, not shown in FIGS. 2–4, and forms an insertion opening 18, FIG. 1, for the lock tongue, which is inserted into the frame as indicated by the arrow 18' in FIG. 4. The anchoring fitting 12 comprises a substantially rigid elongate flat bar of toughened steel sheet, forming an aperture 19 at one end thereof for a bolt connecting the anchoring fitting to the vehicle body. The attachment fitting at the other end thereof is narrowed to form a neck 20 and then widens again to form two flat projections 21 projecting in opposite directions from the side edges of the fitting. The anchoring fitting is slightly angled at said one end at the neck 20.

The projections 21 are received by openings 22 in the side walls of the frame, and these openings basicly are substantially rectangular but one edge thereof forms a cam portion 23. The openings 22 are sufficiently large to enable the flat projections 21 to be passed into the openings before the pin 17 has been attached to the web of the frame. This can be done by bringing the anchoring fitting askew towards one side or the other in relation to the frame in the plane of the fitting, which is made possible by the side recesses formed at the neck 20. Then, when the pin has been attached, the projections 21 are prevented from being withdrawn from the openings 22 by the pin 17 which forms an abutment for the end edge of the anchoring fitting 12, and also by shoulders 21' on the anchoring fitting at the projections 21, engaging the inner sides of the side walls of the frame. A semicircular recess 25 is formed by the end edge of the anchoring fitting 12 to receive the pin 17.

A loop spring 24 of spring wire engages at the web thereof one side of the anchoring fitting 12 at the neck 20 while the legs thereof are bent around the projections 21 and engage the web of the channeled frame. Thus, the frame is biased to engage the anchoring fitting 12 at the cam portion 23 while the end of the angular fitting engages the web of the frame. Under the bias of the spring 24 engaged between the anchoring fitting 12 and the frame 16, the lock is held in the position shown in FIG. 4, defining a normal position in which the lock is substantially aligned with the anchoring fitting 12 as shown in FIG. 1 with regard to the right lock. In this position the opening 18 for the insertion of the lock tongue 14 is directed substantially straightly upwards so as to be easy to find such that the lock tongue can be inserted into the lock comfortably and at lowermost friction.

However, the lock can be pivoted against the bias of the spring 24 in relation to the anchoring fitting 12 about an axis which is substantially parallel to the web of the frame 16 and is defined by the projections 21, to attain the position shown for the left lock in FIG. 1 and by dot-and-dash lines in FIG. 4. This will happen when the lock is connected to the lock tongue 14 and the belt strap is tightened over the person using the vehicle safety belt, under the spring bias of the retractor, as shown in FIG. 1. Thus, the lock can adapt itself to the geometry of the vehicle safety belt and take the position which is most appropriate in order to avoid breaking in the lock. At the angular adjustment of the lock the frame 16 will be pivoted on the anchoring fitting 12 at the cam portions 23 which roll on the associated projections 21.

In the anchoring fitting 12 there may be punched a number of apertures to reduce in an appropriate manner the rigidity of the anchoring fitting such that the anchoring fitting will blend when the vehicle safety belt is loaded, before the connection between the lock and the anchoring fitting breaks.

The pin 17 can be used for connecting the lock in a conventional manner to an anchoring fitting of another type than that shown herein, for example an anchoring fitting of the type comprising a loop of wire rope.

We claim:

1. A safety belt system comprising a channeled frame constructed with a lock for receiving a lock tongue, a substantially rigid elongated anchoring member having a predetermined length and width, said member pivotally engaging said frame at one end and including a pair of projections extending generally orthogonally from the longitudinal axis of said anchoring member and also having a notch in said member at said one end, said frame having a pair of openings located to receive said projections, said frame being narrower than said projections but at least equal to said width at the engagement of the frame and anchoring member, a pin rigidly affixed to said frame being at least partially enveloped by said notch, whereby rotational movement of said anchoring member and said frame is limited by contact between said projections and openings and said pin and notch.

2. A lock system according to claim 1 wherein said notch and pin are circular and wherein one half of said pin is encompassed by said notch.

3. A system according to claim 2 wherein said anchoring member includes tapered portions adjacent to and on both sides of said projections.

4. A system according to claim 3 further including bias means around said projections and engaging said frame for biasing said frame into a position generally planar with said anchoring member.

* * * * *